United States Patent
Ebenau et al.

(10) Patent No.: US 9,676,967 B2
(45) Date of Patent: Jun. 13, 2017

(54) GROOVED ADHESIVE TAPE

(71) Applicant: TESA SE, Hamburg (DE)

(72) Inventors: Steffen Ebenau, Hamburg (DE); Nils Thebud, Lüneburg (DE)

(73) Assignee: TESA SE, Norderstedt (DE)

( * ) Notice: Subject to any disclaimer, the term of this patent is extended or adjusted under 35 U.S.C. 154(b) by 0 days.

(21) Appl. No.: 14/424,122

(22) PCT Filed: Aug. 1, 2013

(86) PCT No.: PCT/EP2013/066203
§ 371 (c)(1),
(2) Date: Feb. 26, 2015

(87) PCT Pub. No.: WO2014/032905
PCT Pub. Date: Mar. 6, 2014

(65) Prior Publication Data
US 2015/0225612 A1 Aug. 13, 2015

(30) Foreign Application Priority Data
Aug. 29, 2012 (DE) .................... 10 2012 215 345

(51) Int. Cl.
*C09J 7/02* (2006.01)
*B29C 59/02* (2006.01)
(Continued)

(52) U.S. Cl.
CPC ............. *C09J 7/0207* (2013.01); *B29C 59/02* (2013.01); *B29C 65/5085* (2013.01);
(Continued)

(58) Field of Classification Search
CPC .... C09J 7/0207; C09J 7/0232; C09J 2201/28; C09J 7/0246; C09J 7/0289; C09J 7/025;
(Continued)

(56) References Cited

U.S. PATENT DOCUMENTS 5,141,790 A 8/1992 Calhoun et al.
5,268,228 A 12/1993 Orr
(Continued)

FOREIGN PATENT DOCUMENTS

CN 1724605 A 1/2006
CN 1795402 A 6/2006
(Continued)

OTHER PUBLICATIONS

German Search Report for corresponding application 10 2012 215 345.4 dated Apr. 26, 2013.
(Continued)

*Primary Examiner* — Patricia L Nordmeyer
(74) *Attorney, Agent, or Firm* — Norris McLaughlin & Marcus, P.A.

(57) ABSTRACT

The aim of the invention is to improve an impairment to the adherence of an adhesive tape to a substrate caused by the inclusion of air bubbles between the adhesive tape and the substrate. According to the invention, said aim is achieved by means of an adhesive tape which comprises at least one adhesive layer, wherein the adhesive layer has at least one groove and none of the grooves extends as far as one of the lateral edges of the adhesive layer. The invention further relates to a release liner having a surface which has at least one ridge, wherein none of the ridges extends as far as one of the lateral edges of the release liner.

10 Claims, 2 Drawing Sheets

(51) Int. Cl.
*B32B 38/00* (2006.01)
*B32B 37/18* (2006.01)
*B32B 37/12* (2006.01)
*B41F 27/12* (2006.01)
*B29C 65/50* (2006.01)
*B41N 6/02* (2006.01)
*B29L 31/00* (2006.01)
*C09J 133/08* (2006.01)
*B29L 7/00* (2006.01)

(52) U.S. Cl.
CPC .............. *B32B 37/12* (2013.01); *B32B 37/18* (2013.01); *B32B 38/0012* (2013.01); *B41F 27/1275* (2013.01); *C09J 7/025* (2013.01); *C09J 7/0232* (2013.01); *C09J 7/0246* (2013.01); *C09J 7/0289* (2013.01); *B29L 2007/007* (2013.01); *B29L 2031/767* (2013.01); *B32B 2405/00* (2013.01); *B41N 6/02* (2013.01); *C09J 133/08* (2013.01); *C09J 2201/122* (2013.01); *C09J 2201/128* (2013.01); *C09J 2201/28* (2013.01); *C09J 2201/606* (2013.01); *C09J 2400/283* (2013.01); *C09J 2423/046* (2013.01); *C09J 2423/106* (2013.01); *C09J 2433/00* (2013.01); *C09J 2467/006* (2013.01); *C09J 2483/005* (2013.01); *Y10T 156/10* (2015.01); *Y10T 156/1002* (2015.01); *Y10T 428/1476* (2015.01); *Y10T 428/24479* (2015.01); *Y10T 428/24504* (2015.01); *Y10T 428/24612* (2015.01)

(58) Field of Classification Search
CPC ............ C09J 2201/128; C09J 2201/122; C09J 2201/606; C09J 133/08; C09J 2467/006; C09J 2433/00; C09J 2400/283; C09J 2423/106; C09J 2423/046; C09J 2483/005; Y10T 428/1476; Y10T 428/24975; Y10T 428/265; Y10T 428/28; Y10T 428/14; Y10T 428/1486; Y10T 428/24479; Y10T 428/24504; Y10T 428/24612; Y10T 156/1002; B41F 27/1275; B29L 2031/767; B29L 2007/007; B32B 2405/00; B32B 38/0012; B32B 37/18; B32B 37/12; B41N 6/02; B29C 65/5085; B29C 59/02

See application file for complete search history.

(56) References Cited

U.S. PATENT DOCUMENTS

| 5,296,277 | A  | 3/1994 | Wilson et al. |
|---|---|---|---|
| 5,362,516 | A  | 11/1994 | Wilson et al. |
| 7,867,601 | B2 | 1/2011 | Ikishima et al. |
| 2004/0241393 | A1 | 12/2004 | Thakkar et al. |
| 2006/0019069 | A1 | 1/2006 | Ikishima et al. |
| 2007/0292650 | A1 | 12/2007 | Suzuki |
| 2008/0202682 | A1 | 8/2008 | Husemann et al. |
| 2011/0014411 | A1 | 1/2011 | Hagiwara et al. |
| 2011/0014462 | A1 | 1/2011 | Kanda |

FOREIGN PATENT DOCUMENTS

| CN | 101668824 A | 3/2010 |
|---|---|---|
| CN | 101959984 A | 1/2011 |
| CN | 102015940 A | 4/2011 |
| DE | 10 2005 061 768 A1 | 6/2007 |
| DE | 10 2006 062 247 A1 | 6/2008 |
| EP | 1 739 147 A1 | 4/2005 |
| EP | 2 258 781 A1 | 3/2009 |
| GB | 1 511 060 | 5/1978 |
| GB | 2 412 335 A1 | 9/2005 |
| JP | H 05 289319 A | 11/1993 |
| WO | 98 29516 A1 | 7/1998 |
| WO | 02 11985 A1 | 2/2002 |
| WO | 2007079919 A1 | 7/2007 |

OTHER PUBLICATIONS

International Search Report for corresponding PCT/EP2013/066203 mailed Nov. 19, 2013.

English translation of First Office Action issued in corresponding Chinese application and Search Report.

GROOVED ADHESIVE TAPE

This application is a 371 of International Patent Application No. PCT/EP2013/066203 filed Aug. 1, 2013, which claims foreign priority benefit under 35 U.S.C. §119 of the German Patent Application No. 10 2012 215 345.4, filed Aug. 29, 2012, the disclosures of which patent applications are incorporated herein by reference.

The invention is situated within the technical field of adhesive tapes. The invention relates in particular to adhesive tapes having a particular topography in the surface of an adhesive layer.

Adhesive tapes are used in a wide variety of ways to join substrates, but also, for example, as masking tapes or insulating tapes. An important role in the context of bonds with adhesive tapes is played by the nature of the contact area between adhesive and substrate. This contact area may be adversely affected by a variety of external influences, these influences leading in general to a reduction in the available contact area, in turn causing the quality of the target bond to drop. The contact area may be reduced, for example, by air inclusions between adhesive and substrate. This is frequently manifested in imprecise bonds and/or in bonds which lack strength and durability.

The precise positioning of substrates to be bonded is vital, for example, in flexographic printing processes. These are rotational printing processes where flexible printing plates made from photopolymer or rubber are utilized, the plates having a relief corresponding to the information to be applied by printing. These printing plates or printing forms are fastened on a printing cylinder. This is done using adhesive tapes which by virtue of their compressibility properties substantially influence the print quality.

In the printing process, the printing plate then passes through an ink reservoir, where the relief takes up the printing ink. The printing cylinder then transports the printing plate to a transfer station, where the surface containing printing ink comes into contact with the substrate to be printed. On removal of the printing plate from the substrate, the film of printing ink splits and leaves behind an imprint corresponding to the relief present on the printing plate surface. Ink transfer requires precise monitoring of the applied pressure when placing the printing plate onto the substrate, this pressure substantially determining the thickness of application and the uniformity of the printed image.

A double-sided adhesive tape is typically used for fastening the printing plate on the printing cylinder. In order to ensure high print quality, the printing plate must be very carefully mounted on the printing cylinder and precisely positioned. It is oftentimes necessary for the position of the plate to have to be adjusted a number of times. In the course of the mounting of the plate on the printing cylinder, and in the course of possible repositioning, the inclusion of air occurs frequently at the interfaces between printing plate and adhesive tape and/or between adhesive tape and carrier or printing cylinder. Air bubbles of this kind lead to changes in the pressure applied when placing the printing plate onto the substrate, and constitute one of the most frequent sources of error in flexographic printing processes.

While it is possible in principle to remove the air inclusions using syringes or knives, these tools may also cause damage to the printing plates. Attempts have therefore been made to counter the inclusion of air bubbles by specific adhesive tape architectures. For instance, adhesive tapes with adhesive in a parallel stripe or corrugated pattern have been used. Such adhesive tapes, however, have proven to lack sufficient reliability in terms of the bonding quality achieved. Although they did allow air to escape efficiently from the interfaces, the bonding effect between carrier and printing plate lack sufficient reliability, especially at high throughput rates. Adhesive tapes with an irregular relief of adhesive were also trialed, but likewise gave inadequate bonding strengths and, moreover, continued to have air inclusions in certain regions.

U.S. Pat. No. 5,296,277 describes an adhesive tape having a number of elevations in the adhesive layer, these elevations having flattened, adhesive tips whose area is less than 25% of the total area of the adhesive layer.

U.S. Pat. No. 5,362,516 describes the structuring of the surface of an adhesive layer by means of beads which are applied beforehand and over which the adhesive is then spread. A similar construction is subject matter of U.S. Pat. No. 5,141,790, in which case the structuring is achieved via particles which are incorporated into the adhesive layer and whose tips are substantially free of adhesive.

GB 1 511 060 describes an adhesive layer having at least one relatively long ridge or cutout, with at least one of these structures breaking through the outer edge of the adhesive layer.

U.S. Pat. No. 5,268,228 describes a double-sided adhesive tape having joints in the adhesive layer on one or both sides, the purpose of these joints being to divert the air during bonding, and their size being such that they very largely disappear after bonding.

WO 98/29516 A1 as well relates to adhesive layers with an embossed relief, and describes a method for controlling the topography of an adhesive surface, wherein the relief or topography of the adhesive layer controls the bonding performance.

WO 02/11985 A1 describes adhesive tapes for use in flexographic printing processes, the tapes having a regular pattern of permanent channels. Furthermore, the specification describes flexographic printing processes and other components of an apparatus for flexographic printing.

The measures known to date for preventing air inclusions provide for the air to be carried away outwardly. As a result, however, the problem of capillary effects—which may even cause air to be drawn in—arises frequently. There are often disadvantages in the distribution of the wetting area and/or of the bond strengths, owing to the air removal channels that are present in the adhesive layer, and this can lead to deficient bonds. It is possible, for example, that air is not taken off toward the outside at all, but instead is merely shifted within the adhesive layer into the next cavity. Here there may be substantial accumulations of air, which lower the accuracy of the bond and/or of the positioning of the substrate. Furthermore, the contact area actually achieved between adhesive and substrate is heavily dependent on the pressure exerted.

It is an object of the invention, therefore, to provide an adhesive tape with which the above problems can be overcome. The adhesive tape is intended in particular to counteract the displacement of air bubbles within the adhesive tape as a result of the prevailing applied pressure, and to allow largely constant bond areas and bond strengths independently of the applied pressure.

The achievement of this object is based on the idea that the included air should not be diverted to the outside, but should instead be diverted into and held in defined recesses within the adhesive layer. A first subject of the invention, therefore, is an adhesive tape which comprises at least one adhesive layer, wherein the adhesive layer has at least one groove and no groove extends to one of the side edges of the adhesive layer. An adhesive tape of this kind has no capillary effects, since it does not contain any continuous channels. Fluids, and in particular air, are not draw into the bond area, therefore. The clearly delimited and defined bonding area allow the imposition of relatively constant bond strengths, independently of the applied pressure, and the formation of new air bubbles under the influence of an applied pressure prevailing at certain locations of the adhesive tape is avoided.

BRIEF DESCRIPTION OF THE DRAWINGS

The invention will now be described in greater detail with reference to the drawings, wherein.

Figure 1:
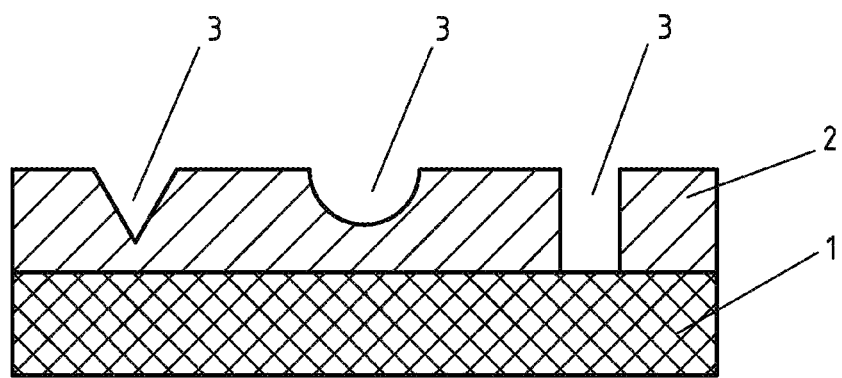
FIG. 1 is a schematic illustrating a number of variants of grooves in the adhesive layer.

An "adhesive layer" means a layer of the adhesive tape of the invention that is able to enter into direct contact with a substrate and to adhere thereto. With preference in accordance with the invention, the adhesive layer is formed of a pressure-sensitive adhesive. This is a viscoelastic adhesive whose set film at room temperature in the dry state remains permanently tacky and adhesive. Bonding takes place by gentle applied pressure, immediately, to virtually all substrates.

The at least one adhesive layer of the adhesive tape of the invention preferably comprises a polymer selected from the group consisting of natural rubbers, synthetic rubbers, polyacrylates, silicones, and mixtures of two or more of the above polymers. More preferably the at least one adhesive layer of the adhesive tape of the invention comprises to an extent of at least 30 wt %, more preferably at least 40 wt %, and more particularly at least 50 wt %, based on the total weight of the adhesive layer, a polymer selected from the group consisting of natural rubbers, synthetic rubbers, polyacrylates, silicones, and mixtures of two or more of the above polymers.

Synthetic rubbers preferably comprise styrene-butadiene copolymers, block copolymers such as, for example, styrene-isoprene-styrene, styrene-butadiene-styrene, styrene-ethylene/butylene-styrene, styrene-ethylene/propylene styrene, and combinations of the above copolymers. Synthetic rubbers and natural rubbers are commonly used together with at least one bond strength reinforcing resin. Examples of bond strength reinforcing resins contemplated include polymers of unsaturated $C_5$-$C_9$ hydrocarbons, terpene resins, and rosin.

By "polyacrylates" are meant polymers whose monomer base on an amount-of-substance basis is made up to an extent of at least 30% of acrylic acid, methacrylic acid, acrylic esters and/or methacrylic esters, with acrylic esters and/or methacrylic esters being present generally at least proportionally and preferably to an extent of at least 30%. More particularly a "polyacrylate" is a polymer obtainable by radical polymerization of acrylic and/or methylacrylic monomers and also, optionally, further, copolymerizable monomers.

Preference is given to using a polyacrylate which can be traced back to the following monomer composition:
a) acrylic esters and/or methacrylic esters of the following formula

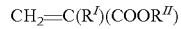

$CH_2=C(R^I)(COOR^{II})$ where $R^I$ is H or $CH_3$ and $R^{II}$ is an alkyl radical having 4 to 14 C atoms,
b) olefinically unsaturated monomers having functional groups which are reactive toward epoxide groups, for example,
c) optionally further acrylates and/or methacrylates and/or olefinically unsaturated monomers which are copolymerizable with component (a).

For the application of the polyacrylate as a pressure-sensitive adhesive, the proportions of the corresponding components (a), (b), and (c) are selected such that the product of polymerization has in particular a glass transition temperature ≤15° C. (DMA at low frequencies).

For the preparation of pressure-sensitive adhesives, it is very advantageous to select the monomers of component (a) with a fraction of 45 to 99 wt %, the monomers of component (b) with a fraction of 1 to 15 wt %, and the monomers of component (c) with a fraction of 0 to 40 wt % (the figures are based on the monomer mixture for the "base polymer", in other words without additions of possible additives to the completed polymer, such as resins etc.).

In particular, the monomers of component (a) are plasticizing and/or nonpolar monomers. Preferred for use as monomers (a) are acrylic and methacrylic esters with alkyl groups consisting of 4 to 14 C atoms, more preferably 4 to 9 C atoms. Examples of such monomers are n-butyl acrylate, n-butyl methacrylate, n-pentyl acrylate, n-pentyl methacrylate, n-amyl acrylate, n-hexyl acrylate, hexyl methacrylate, n-heptyl acrylate, n-octyl acrylate, n-octyl methacrylate, n-nonyl acrylate, isobutyl acrylate, isooctyl acrylate, isooctyl methacrylate, and their branched isomers, such as 2-ethylhexyl acrylate or 2-ethylhexyl methacrylate, for example.

In particular, the monomers of component (b) are olefinically unsaturated monomers having functional groups, in particular having functional groups which are able to enter into a reaction with epoxide groups.

For component (b), preference is given to using monomers with functional groups which are selected from the group encompassing the following: hydroxyl, carboxyl, sulfonic acid or phosphonic acid groups, acid anhydrides, epoxides, amines.

Particularly preferred examples of monomers of component (b) are acrylic acid, methacrylic acid, itaconic acid, maleic acid, fumaric acid, crotonic acid, aconitic acid, dimethylacrylic acid, β-acryloyloxypropionic acid, trichloroacrylic acid, vinylacetic acid, vinylphosphonic acid, itaconic acid, maleic anhydride, hydroxyethyl acrylate, hydroxypropyl acrylate, hydroxyethyl methacrylate, hydroxypropyl methacrylate, 6-hydroxyhexyl methacrylate, allyl alcohol, glycidyl acrylate, glycidyl methacrylate.

In principle it is possible as component (c) to use all vinylically functionalized compounds which are copolymerizable with component (a) and/or with component (b). The monomers of component (c) may serve to adjust the properties of the resultant pressure-sensitive adhesive.

Exemplary monomers of component (c) are as follows: methyl acrylate, ethyl acrylate, propyl acrylate, methyl methacrylate, ethyl methacrylate, benzyl acrylate, benzyl methacrylate, sec-butyl acrylate, tert-butylacrylate, phenyl acrylate, phenyl methacrylate, isobornyl acrylate, isobornyl methacrylate, tert-butyl phenyl acrylate, tert-butylphenyl methacrylate, dodecyl methacrylate, isodecyl acrylate, lauryl acrylate, n-undecyl acrylate, stearyl acrylate, tridecyl acrylate, behenyl acrylate, cyclohexyl methacrylate, cyclopentyl methacrylate, phenoxyethyl acrylate, phenoxyethyl methacrylate, 2-butoxyethyl methacrylate, 2-butoxyethyl acrylate, 3,3,5-trimethylcyclohexyl acrylate, 3,5-dimethyladamantyl acrylate, 4-cumylphenyl methacrylate, cyanoethyl acrylate, cyanoethyl methacrylate, 4-biphenylyl acrylate, 4-biphenylyl methacrylate, 2-naphthyl acrylate, 2-naphthyl methacrylate, tetrahydrofurfuryl acrylate, diethylaminoethyl acrylate, diethylaminoethyl methacrylate, dimethylaminoethyl acrylate, dimethylaminoethyl methacrylate, 2-butoxyethyl acrylate, 2-butoxyethyl methacrylate, methyl 3-methoxy acrylate, 3-methoxybutyl acrylate, phenoxyethyl acrylate, phenoxyethyl methacrylate, 2-phenoxyethyl methacrylate, butyldiglycol methacrylate, ethylene glycol acrylate, ethylene glycol monomethyl acrylate, methoxy polyethylene glycol methacrylate 350, methoxy polyethylene glycol methacrylate 500, propylene glycol monomethacrylate, butoxydiethylene glycol methacrylate, ethoxytriethylene glycol methacrylate, octafluoropentyl acrylate, octafluoropentyl methacrylate, 2,2,2-trifluoroethyl methacrylate, 1,1,1,3,3,3-hexafluoroisopropyl acrylate, 1,1,1,3,3,3-hexafluoroisopropyl methacrylate, 2,2,3,3,3-pentafluoropropyl methacrylate, 2,2,3,4,4,4-heptafluorobutyl methacrylate, 2,2,3,3,4,4,4-heptafluorobutyl acrylate, 2,2,3,3,4,4,4-heptafluorobutyl methacrylate, 2,2,3,3,4,4,5,5,6,6,7,7,8,8,8-penta-decafluorooctyl methacrylate, dimethylaminopropylacrylamide, dimethylaminopropylmethacrylamide, N-(1-methylundecyl)acrylamide, N-(n-butoxymethyl)acrylamide, N-(butoxymethyl)methacrylamide, N-(ethoxymethyl)acrylamide, N-(n-octadecyl)acrylamide, and also N,N-dialkyl-substituted amides, such as, for example, N,N-dimethylacrylamide, N,N-dimethylmethacrylamide, N-benzylacrylamides, N-isopropylacrylamide, N-tert-butylacrylamide, N-tert-octylacrylamide, N-methylolacrylamide, N-methylolmethacrylamide, acrylonitrile, methacrylonitrile, vinyl ethers, such as vinyl methyl ether, ethyl vinyl ether, vinyl isobutyl ether, vinyl esters, such as vinyl acetate, vinyl chloride, vinyl halides, vinylidene chloride, vinylidene halides, vinylpyridine, 4-vinylpyridine, N-vinylphthalimide, N-vinyllactam, N-vinylpyrrolidone, styrene, α- and p-methylstyrene, α-butylstyrene, 4-n-butylstyrene, 4-n-decylstyrene, 3,4-dimethoxystyrene. Macromonomers such as 2-polystyreneethyl methacrylate (molecular weight Mw of 4000 to 13 000 g/mol), poly(methyl methacrylate)ethyl methacrylate (Mw of 2000 to 8000 g/mol).

Monomers of component (c) may advantageously also be selected such that they contain functional groups which support subsequent radiation crosslinking (for example by electron beams, UV). Suitable copolymerizable photoinitiators are, for example, benzoin acrylate and acrylate-functionalized benzophenone derivatives. Monomers which support crosslinking by electron beam bombardment are, for example, tetrahydrofurfuryl acrylate, N-tert-butyl acrylamide, and allyl acrylate.

The polyacrylates may be prepared by methods familiar to the skilled person, especially advantageously by conventional radical polymerizations or controlled radical polymerizations. The polyacrylates may be prepared by copolymerizing the monomeric components, using the customary polymerization initiators and also, optionally, chain transfer agents, with polymerization taking place at the customary temperatures in bulk, in emulsion, in water or liquid hydrocarbons for example, or in solution.

The weight-average molecular weights $M_w$ of the polyacrylates are preferably in a range from 20 000 to 2 000 000 g/mol, very preferably in a range from 100 000 to 1 000 000 g/mol, extremely preferably in a range from 150 000 to 500 000 g/mol [the figures for the average molecular weight $M_w$ and for the polydispersity PD in this specification relate to the determination by gel permeation chromatography]. To this end it may be advantageous to conduct the polymerization in the presence of suitable chain transfer agents such as thiols, halogen compounds and/or alcohols, in order to set the desired average molecular weight.

Silicones are preferably polydiorganosiloxanes having a number-average molecular weight of about 5000 to about 10 000 000, more particularly of about 50 000 to about 1 000 000, and/or copolymeric silicone resins, also designated as MQ resins, with a number-average molecular weight of about 100 to about 1 000 000, more particularly of about 500 to about 50 000. the MQ resins contain triorganosilyloxy units and also $SiO_{4/2}$ units. Silicone-based pressure-sensitive adhesives customarily comprise 20 to 60 parts by weight of polydiorganosiloxanes and 40 to 80 parts by weight of one or more MQ resins. The aim is usually for a reaction of the polydiorganosiloxanes with the MQ resins, in order for adhesive properties to be developed. A reaction of this kind may be, for example, a condensation reaction between silanol functionalities present in the MQ resin and terminal silanol groups of the diorganopolysiloxanes. A further possible reaction pathway is formed by addition reactions between alkenyl functionalities of the polydiorganosiloxanes and SiH, alkenyl and/or silanol functionalities of the MQ resins.

The at least one adhesive layer of the adhesive tape of the invention may comprise additives which may contribute to the emphasizing of particular properties of the adhesive layer. These additives may be, for example, pigments, plasticizers, fillers, stabilizers, antioxidants, etc. The proportion of the additives in the adhesive layer is preferably from 0.1 to 50 wt %, based on the total weight of the adhesive layer.

The weight per unit area of the adhesive layer is preferably not more than 200 g/m², more preferably not more than 100 g/m², and more particularly 40 to 100 g/m², as for example 60 to 100 g/m². The stated weight per unit area relates to the fully embossed regions of the adhesive layer, and hence not to the grooves provided in accordance with the invention.

Likewise preferably, the adhesive layer is a coherent adhesive layer. This means an adhesive layer which parallel to its surface has a plane with an adhesive layer which is present continuously, i.e., is unbroken at any location. A coherent adhesive layer will of course have the groove or grooves provided in accordance with the invention, but in the case of a coherent adhesive layer, these grooves must not be so deep that the adhesive layer is interrupted. Provided that the surface of the adhesive layer lies substantially in the x-y plane, accordingly, in the case of a coherent adhesive layer, a section parallel to the x-y plane in a defined depth z must result in adhesive being present at every point in the sectional plane. The surface of the adhesive layer is regarded as being the boundary with the surrounding medium on the side of the adhesive layer that faces the substrate to be bonded; for calculations and for definitions relating to the surface area, the surface area occupied by the grooves is equated with the groove "base area" situated in the plane of the adhesive layer. Accordingly, in the case of a groove, the surface area will be regarded as continuing in the same plane as the adhesive-comprising surface.

The adhesive tape in accordance with the invention may be either a single-sided or a double-sided adhesive tape.

A "groove" means a macroscopically perceptible recess within the adhesive layer, beginning in the surface of the adhesive layer, and able in principle to have any desired shape and depth. Using the representation of a cut made through an adhesive tape of the invention, in the direction of the layer sequence at an angle of 90° to the running direction of the grooves, FIG. 1 illustrates a number of variants of grooves in the adhesive layer. The reference numerals in the figure have the following meanings:
1—carrier
2—adhesive layer
3—grooves.

With preference in accordance with the invention, the groove depth is at least 10 µm, more preferably at least 20 µm, more particularly at least 25 µm, as for example at least 30 µm. The "groove depth" means the maximum extent of a groove perpendicular to the plane in which the surface of the adhesive layer is situated. The surface of the adhesive layer is situated on the substrate-facing side of the adhesive layer. Likewise preferably, the groove depth is not more than 200 µm, more preferably not more than 100 µm, more particularly not more than 60 µm, as for example not more than 50 µm.

Furthermore the depth of all grooves varies preferably by not more than 20%. The uniform topography that is achieved in this way ensures consistent bonding properties over the full extent of the adhesive tape.

With preference in accordance with the invention, the groove width is 10 to 200 µm. The "groove width" means the maximum distance of the groove edges from one another at an angle of 90° to the running direction of the groove, at any desired location in the groove.

Figure 2:
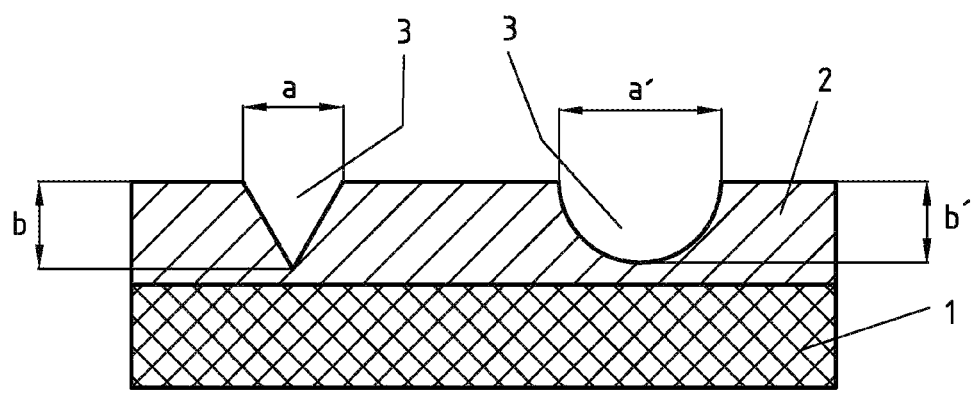
FIG. 2 is a schematic of the adhesive layer, illustrating the meaning of the terms "groove depth" and "groove width".

Using the representation of a cut made through an adhesive tape of the invention parallel to the layer sequence and at an angle of 90° to the running direction of the grooves, FIG. 2 illustrates the meaning of the terms "groove depth" and "groove width". The meaning of the reference numerals in the figure is as follows:
1—carrier
2—adhesive layer
3—grooves
a, a'—groove width
b, b'—groove depth.

In accordance with the invention, no groove extends to one of the side edges of the adhesive layer. This means that no groove has contact with an edge which delimits the surface of the adhesive layer or any face of the adhesive layer that lies below the surface and parallel to the plane of the surface. Instead, there is always at least a minimum amount of adhesive between groove and edge. The design of the groove structure of the adhesive tape of the invention therefore differs from conventional topographies, which provide continuous channels, in contact with side edges, for transporting air away. With the adhesive tape of the invention, the disadvantages of such designs that have already been listed can be avoided, without air inclusions affecting the quality of bonding. The distance between side edge of the adhesive tape and the grooves is preferably at least 1 mm.

The air volume enclosed by the adhesive tape of the invention, and the achievable substrate wetting area, are preferably in a ratio to one another such that pressure stresses and shear stresses that occur in the assembly operation and during the use of the adhesive tape are unable to displace the air. The nongrooved surface of the adhesive layer is preferably 50% to 99%, more particularly 70% to 95%, and very preferably 75% to 90% of the total surface area of the adhesive layer.

The at least one groove is preferably a permanent groove. This means that the rheological properties of the adhesive layer are set in such a way that the adhesive layer topography determined by the groove or grooves is durably retained in its essential extent during the intended utilization of the adhesive tape of the invention. More preferably, "permanent groove" means that the topography is retained in its substantial extent even after multiple utilization of the adhesive tape or after utilization over a relatively long time, as for example over several hours at 20 to 80° C. This permanence of the groove or grooves ensures that even if the adhesive tape comes under multiple or relatively long-lasting stress, air can be accommodated in the recesses intended for that purpose, and hence exact adhesive bonds are possible.

Figure 5:
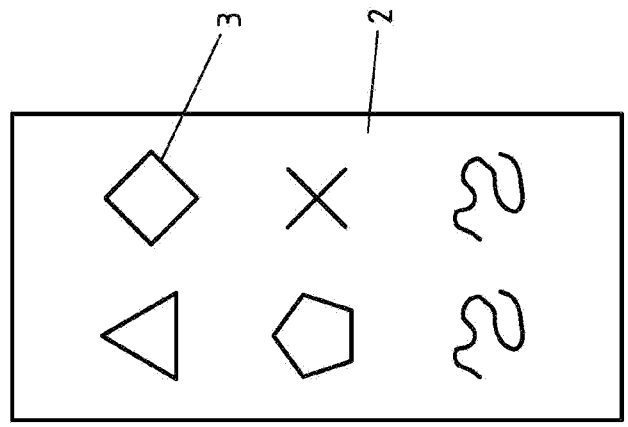
FIG. 5 is a plan view of a grooved adhesive layer and shows different groove shapes present separately from one another.
Figure 4:
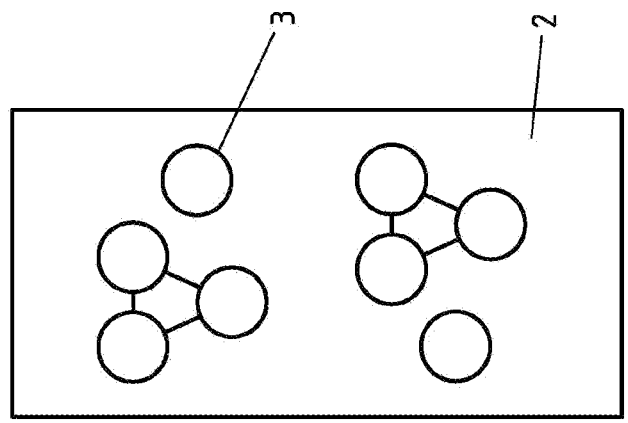
FIG. 4 is a plan view of a grooved adhesive layer and shows repeating groove shapes that are partly separate from one another and partly joined to one another.
Figure 3:
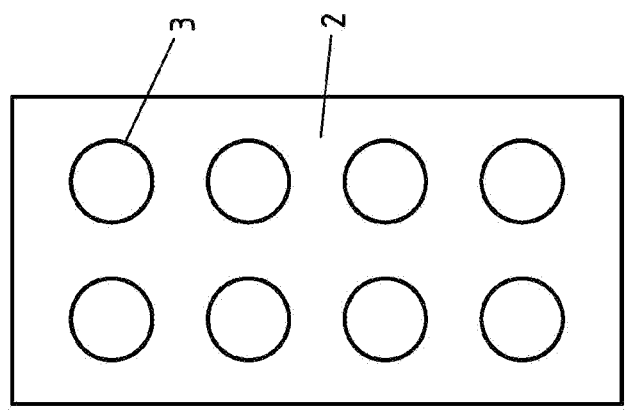
FIG. 3 is a plan view of a grooved adhesive layer and shows repeating shapes that are present separately from one another.

The geometric form of the profile of the grooves is in principle freely selectable and may comprise, for example, lines, circles, polygons and/or amorphous structures. Also possible are indicia, logos, or the like. Repeating patterns may join one another or be present separately from one another. FIGS. 3 to 5 show in each case a plan view of the grooved adhesive layer of an adhesive tape of the invention, and illustrate possible groove shapes. FIG. 3 shows repeating shapes that are present separately from one another. FIG. 4 shows repeating groove shapes that are partly separate from one another and partly joined to one another. FIG. 5 shows different groove shapes present separately from one another. The meanings of the reference numerals in each case are as follows:
2—adhesive layer
3—grooves.

The grooves may, furthermore, in a section in the direction of the layer sequence and at an angle of 90° to their running direction, likewise have in principle any desired form, comprising—for example—triangular, rectangular, or semicircular variants. Some of these forms are already evident from FIG. 1.

The adhesive tape of the invention may comprise further layers. The adhesive tape of the invention preferably comprises a further pressure-sensitive adhesive on the outside of the adhesive tape, opposite the grooved adhesive layer, and/or a stabilizing film, which may be a PET film, for example, and/or a foam layer and/or a laminating adhesive.

The further pressure-sensitive adhesive may be a pressure-sensitive adhesive having grooves in accordance with the invention. The stabilizing film advantageously increases the resistance of the adhesive tape of the invention to tension, and thereby simplifies its demounting. The foam layer increases the printing quality. The laminating adhesive serves in particular for the fixing of the stabilizing film on the foam.

The adhesive tape of the invention includes, for example, the following layers in the stated sequence:
grooved pressure-sensitive adhesive
stabilizing film
laminating adhesive
foam layer
further pressure-sensitive adhesive (grooved or nongrooved).

Also possible is an above construction where there is no laminating adhesive, where the stabilizing film is nevertheless surrounded on both sides by a layer of polyethylene, which has been applied in the form of a liquid composition, for example, to the stabilizing film.

A further subject of the invention is a release liner having at least one surface that features at least one ridge, wherein no ridge extends to one of the edges of the release liner. With a release liner of this kind, the structure defined by the ridges can be easily embossed into the adhesive layer, and so the groove pattern described above can be produced there.

A release liner—also referred to below simply as a liner—is a lining material which has a nonstick (adhesive) surface and which is applied directly to an adhesive for temporary protection of the adhesive, and which can generally be removed by simple peeling immediately prior to application of the adhesive. Among other things, a release liner ensures that the adhesive is not soiled prior to use. In addition, release liners may be adjusted, by the nature and composition of the release materials, in such a way that the adhesive tape can be unwound with the desired force (easily or with difficulty). Moreover, in the case of adhesive tapes coated with adhesive on both sides, the release liner ensures that the correct side of the adhesive is exposed first on unwind.

A liner is not part of an adhesive tape, but instead is just an aid to its production, storage, or for further processing. Furthermore, unlike an adhesive tape carrier, a liner is not joined permanently to a layer of adhesive; instead, the assembly is only temporary and not lasting.

A "ridge" means a macroscopically perceptible elevation that begins in the surface of the liner and that may in principle have any desired shape and height within the context of the invention. For possible forms and patterns of arrangement of the ridges in the liner, the comments made above concerning the grooves and the groove pattern of the adhesive layer apply correspondingly. The geometric form of the profile of the ridges is therefore in principle likewise freely selectable and may include, for example, lines, circles, polygons and/or amorphous structures. Also possible are indicia, logos, or the like. Repeating patterns may be joined to one another or be present separately from one another. In cross section, for example, the ridges comprise triangular, rectangular, or semicircular variants.

A "surface" of the liner is considered to mean the respective boundary of the two sides of the liner with the surrounding medium; for calculations and for definitions relating to the surface area, the area occupied by the ridges is equated with the base area at the foot of the ridges. With preference in accordance with the invention, the area occupied by ridges, as a proportion of the liner surface featuring at least one ridge, is 1% to 50%, more preferably 5% to 30%, and more particularly from 10% to 25%. The "area occupied by ridges" is the base area of the surface in question that is occupied by ridges; the surface area of the ridge itself remains immaterial in this context.

In accordance with the invention, no ridge extends to one of the side edges of the release liner. This means, in a sense corresponding to the groove pattern of the adhesive tape of the invention, that no ridge has contact with an edge that delimits the surface of the liner.

The ridge height of the release liner of the invention is preferably 10 to 200 µm, more preferably 20 to 100 µm, more particularly 25 to 60 µm, for example 30 to 50 µm. The "ridge height" means the maximum extent of a ridge perpendicular to the plane in which the surface of the liner is located.

The ridge width at the foot of the ridge is preferably 10 to 200 µm. The "ridge width" means the maximum distance between two points at the foot of the ridge from one another at an angle of 90° to the running direction of the ridge at any desired location on the ridge.

Measurement of the extent of the ridges in the liner of the invention and of the grooves of the adhesive tape of the invention, particularly the measurement of the ridge heights and groove depths, is accomplished by means of scanning electron microscopy (SEM).

The liner of the invention may comprise at least one ridge on one side or else on both sides.

The liner of the invention preferably comprises at least one carrier and at least one release material.

The carrier material of the liner of the invention preferably comprises a polymer selected from the group consisting of propylene, more particularly monoaxially and biaxially oriented polypropylene, polyethylene terephthalate, polyethylene, polyvinyl chloride, and mixtures of two or more of the above polymers. More preferably the carrier material of the liner of the invention comprises at least 30 wt %, more preferably at least 50 wt %, more particularly at least 70 wt %, as for example at least 90 wt %, of a polymer selected from the group consisting of polypropylene, more particularly monoaxially and biaxially oriented polypropylene, polyethylene terephthalate, polyethylene, polyvinyl chloride, and mixtures of two or more of the above polymers. The carrier material of the liner more preferably comprises polypropylene or a triple extrudate with the following sequence: polyethylene-polypropylene-polyethylene.

As release agents or release material it is possible in principle to use all systems known to the skilled person. The release agent is preferably selected from the group of silicone, fluorinated silicone, silicone copolymers, waxes, carbamates, or mixtures of two or more of the stated substances.

The release agent may comprise solvent-borne and/or solvent-free systems, with solvent-borne systems being preferred. The release agent, furthermore, may be radiation-crosslinking (by UV or electron beam), condensation-crosslinking, or addition-crosslinking; preferably it is condensation-crosslinking.

Release agents used are preferably crosslinkable silicone systems. These include mixtures of crosslinking catalysts and what are called thermally curable condensation-crosslinking or addition-crosslinking polysiloxanes. For condensation-crosslinking silicone systems, tin compounds such as dibutyltin diacetate are frequently present as crosslinking catalysts in the composition.

The liner of the invention may also comprise paper coated with one of the above release agents.

The thickness of the liner, disregarding the ridges, is preferably 20 to 200 µm.

A further subject of the invention is a method for generating at least one groove in a surface of adhesive, at least comprising
the contacting of the surface of a material, said surface featuring at least one ridge, with the surface of an adhesive layer in such a way that the surface of material featuring at least one ridge generates, in the surface of the adhesive layer, a topography of grooves which is essentially the inverse of the topography of the surface of material featuring at least one ridge;
and no groove extends to one of the side edges of the adhesive layer. The above definitions of terms such as "groove", "surface", etc., apply in full.

The above surface of material is preferably the surface featuring at least one ridge on the release liner of the invention. The ridge topography on the surface of the liner of the invention may be obtained, for example, by shaping (embossing methods), primary forming (cast film), or by printing.

In accordance with the method of the invention, the topography of the liner may be transmitted to the adhesive layer, for example, by directly coating the liner with the adhesive or by bringing it into contact with the adhesive by lamination.

A further subject of the invention is an assembly which comprises a release liner of the invention and a layer of adhesive in direct contact with the release liner surface featuring at least one ridge, the layer of adhesive having a topography which is essentially the inverse of the topography of the release liner surface featuring at least one ridge.

The invention claimed is:

1. An adhesive tape comprising:
   (a) an adhesive layer;
   (b) a stabilizing film layer;
   (c) a foam layer;
   and either:
   (d1) a laminating adhesive between the stabilizing film layer and the foam layer; or
   (d2) a polyethylene layer on either side of the stabilizing film layer;
   wherein the adhesive layer has at least one groove and no groove extends to one of the side edges of the adhesive layer.

2. The adhesive tape as claimed in claim 1, wherein the adhesive layer is a coherent adhesive layer.

3. The adhesive tape as claimed in claim 1, wherein the nongrooved surface area of the adhesive layer is 50% to 99% of the total surface area of the adhesive layer.

4. The adhesive tape as claimed in claim 1, wherein the groove depth is at least 10 μm.

5. The adhesive tape as claimed in claim 1, wherein the groove depth is not more than 100 μm.

6. The adhesive tape as claimed in claim 1, wherein the groove width is 10 to 200 μm.

7. The adhesive tape as claimed in claim 1, wherein the at least one groove is a permanent groove.

8. The adhesive tape as claimed in claim 1, wherein the adhesive layer is a pressure-sensitive adhesive.

9. The adhesive tape as claimed in claim 8, which further comprises a grooved or ungrooved pressure-sensitive adhesive adhered to said foam layer.

10. The adhesive tape as claimed in claim 9, which comprises the following layer sequence: grooved pressure-sensitive adhesive/stabilizing film/laminating adhesive/foam layer/grooved or ungrooved further pressure-sensitive adhesive.

* * * * *